United States Patent
Ludwig (10) Patent No.: US 6,782,769 B2
(45) Date of Patent: Aug. 31, 2004

(54) MONITORING DEVICE (75) Inventor: Rainer Ludwig, Balgheim (DE)

(73) Assignee: Middex-Electronic GmbH, Balgheim (DE)

(*) Notice: Subject to any disclaimer, the term of this patent is extended or adjusted under 35 U.S.C. 154(b) by 405 days.

(21) Appl. No.: 09/758,515

(22) Filed: Jan. 11, 2001

(65) Prior Publication Data
US 2001/0015696 A1 Aug. 23, 2001

(30) Foreign Application Priority Data
Jan. 17, 2000 (DE) .......................................... 100 00 954

(51) Int. Cl.$^7$ ............................................. G01N 19/00
(52) U.S. Cl. ................................................. 73/865.8
(58) Field of Search ............................ 73/865.8, 865.9; 340/680, 686; 33/561

(56) References Cited

U.S. PATENT DOCUMENTS

| | | | |
|---|---|---|---|
| 4,901,253 A | 2/1990 | Iwano et al. ................. | 364/522 |
| 4,928,517 A * | 5/1990 | Fitts ............................ | 73/105 |
| 5,841,290 A * | 11/1998 | Bentzien et al. ............ | 324/714 |
| 6,130,516 A | 10/2000 | Huber et al. ................. | 318/572 |

FOREIGN PATENT DOCUMENTS

| | | |
|---|---|---|
| DE | 30 03 431 | 8/1981 |
| DE | 38 05 500 | 9/1988 |
| DE | 40 33 181 | 4/1992 |
| DE | 43 10 872 | 10/1994 |
| DE | 196 08 628 | 9/1997 |
| EP | 618 521 | 10/1994 |
| WO | WO88/02139 | 3/1988 |
| WO | WO90/07097 | 6/1990 |
| WO | WO92/21470 | 12/1992 |

OTHER PUBLICATIONS

Application Serial No. 09/758,513 filed Jan. 11, 2001.
Application Serial No. 09/758,514 filed Jan. 11, 2001.

* cited by examiner

Primary Examiner—Robert Raevis (57) ABSTRACT

In order to improve a monitoring device for checking for a predefined position of a body or for checking for the presence of a body, comprising a pivotal checking element, a motor for driving the checking element and a control device for controlling the pivotal movement of the checking element, in such a manner that it is universally employable and, in particular, the exertion of too high a force on a body is prevented, it is proposed that the checking element be adapted to be pivoted commencing from a starting position through a transition region into a monitoring region in which the predefined position of the body lies or in which the presence of a body should be monitored, and that the control device limit the torque of the checking element in such a manner that the maximum possible torque in the monitoring region is reduced relative to that in the transition region.

36 Claims, 3 Drawing Sheets

FIG. 4

MONITORING DEVICE

The present disclosure relates to the subject matter disclosed in German patent application No. 100 00 954.9 of Jan. 17, 2000, the entire specification of which is incorporated herein by reference.

The invention relates to a monitoring device for checking for a predefined position of a body or for checking for the presence of a body, comprising a pivotal checking element, a motor for driving the checking element and a control device for controlling the pivotal movement of the checking element.

Monitoring devices of this type are known from DE 30 03 431 C2, DE 43 10 872 A1 or DE 196 08 628 A1.

They are employed in machine tools for example in order to check whether a tool, such as a drill for example, is still in a predefined position or, for example, has broken off, or for checking as to whether a "foreign body" has entered a region in which such a body would constitute a disturbance.

In DE 30 03 431 C2, it is proposed, for the purposes of setting the sensitivity or impact weight, on the tool or workpiece being monitored, of a sensing needle which is seated in the checking element, that the rotational speed of a dc motor and hence the pivotal speed of the sensing needle be altered.

Commencing from the state of the art, the object of the invention is to improve a monitoring device of the generic kind in such a manner that the monitoring device will be universally employable in a simple manner and in particular that damage to a body being monitored will, to a large extent, be avoidable when rapidly executing a monitoring operation.

In accordance with the invention, this object is achieved in a monitoring device of the type described hereinabove in that the checking element is adapted to be pivoted commencing from a starting position through a transition region into a monitoring region in which the predefined position of the body lies or in which the presence of a body should be monitored, and in that the control device limits the torque of the checking element in such a manner that the maximum possible torque in the monitoring region is reduced relative to that in the transition region.

By virtue of the inventive concept, it is firstly ensured that the checking element will reach the monitoring region quickly, i.e. that it can pass through the transition region with a high torque value. Secondly, in the monitoring region, the checking element will strike a body that is possibly located therein with a small amount of torque since the maximum possible torque has been reduced. The checking element will exert a force on the body even when its speed is zero i.e. it is resting on the body. By reducing the torque limit, it is ensured, in accordance with the invention, that this force will not be too large and, in particular, will not exceed a force which could destroy the body, such as a tool for example.

Account should be taken of the fact that, if the pivotal movement of the checking element is stopped by a body in the monitoring region, the control device will attempt to counteract this, i.e. the torque will be increased for a short period despite the reduction in speed. The body, on which the checking element then rests, may thereby be subjected to an increased load. Since the control process for the pivotal movement of the checking element has a certain time constant, such a short term rise in torque cannot generally be prevented. However, by virtue of the solution in accordance with the invention, whereby there is a predefined upper limit for the torque in the monitoring region, this being reduced relative to the upper limit in the transition region, the torque will be prevented from exceeding a certain value and hence the force on the body will also be prevented from exceeding a certain value.

A sensing needle is preferably arranged on the checking element. The torque will alter in correspondence with the differing lengths of the sensing needle. However, by virtue of the solution in accordance with the invention, it is always ensured that the torque will not exceed an upper limiting value independently of its actual value.

Furthermore, in accordance with the invention, provision may be made for a seal to be arranged between the checking element and the housing. A frictional moment is exerted by this seal which counteracts the torque of a shaft which is driven by the motor.

The absolute value of the torque may thereby alter in this case too. However, in accordance with the invention, it is always ensured that an upper limit for the torque will not be exceeded.

It is especially very advantageous if the motor is a dc motor and if the control device limits the supply of current to the motor. The torque, which the motor can exert, is set by the current through the motor. If the supply of current is limited, then the maximum permissible amount of torque can be set in a simple manner, and, in particular, the maximum permissible torque in the monitoring region can be correspondingly reduced by reducing the supply of current.

It is especially very expedient if the pivotal movement of the checking element is controlled by means of a combined position, speed and torque controlling. The pivotal movement can then be matched to the demands, and in particular, the transition region can be passed through quickly and the predefined position of a body in the monitoring region can be monitored without fear of damaging or even destroying the body.

It is expedient for the speed of the checking element to be reducible during its passage from the transition region into the monitoring region so as to produce the requisite control and regulation of the monitoring process in the monitoring region.

It is especially very expedient if the reduction of the torque limit is effected after the reduction in the speed of the checking element. On the one hand, it is thereby ensured that the speed of the checking element will be reduced in the monitoring region and, in particular, that the reduction of the torque limit will not prevent the speed sinking to a predefined value, but, on the other hand, it is nevertheless ensured that the checking element will not strike against a body in the monitoring region with too great a torque.

It is especially very advantageous if the control device comprises an angle transmitter. This may, in particular, be an incremental transmitter. The pivotal movement of the checking element can then be controlled in a simple manner.

It is expedient if the transition region comprises an acceleration region in which the speed of the checking element is increased commencing from the starting position. Commencing, in particular, from a static position of the checking element, this thereby permits its speed to increase rapidly so that it can pass quickly through the transition region.

Moreover, it is advantageous if the transition region comprises a braking region in which the speed of the checking element is reduced. In a simple manner, this arrangement permits the checking element to be pivoted in the monitoring region at a lower speed than in the transition region so as to prevent a hard impact between the checking element and the body that is to be monitored.

It is expedient for the speed of the checking element to be maintained substantially constant between an acceleration region and a braking region of the transition region. This thereby results in improved control and regulating possibilities since the pivotal angle is proportional to time in this region, and improved control and regulating possibilities are also created since non-linear calculations do not need to be carried out in this region whereby the adjusting behaviour for the controlled value when such controlling is required will then be improved because of the linear relationship between the pivotal angle and the time.

It is also particularly advantageous if the speed of the checking element is maintained substantially constant in the monitoring region. In essence, the reasons for this are the same as were indicated immediately above.

It is especially expedient for the control of the pivotal movement, if the control device controls the speed and torque by means of the time-dependent control of the position of the checking element. The position can be directly determined from the output of the digital angle transmitter, and since a specific pivotal angle will be turned through in specific intervals of time, the time increments can also be determined in a simple manner. By forming the corresponding quotient, the speed of the checking element can be determined to at least a first approximation. It is particularly advantageous here, if the control device defines the pivotal position of the checking element. Furthermore, it is advantageous if the control device defines the pivotal speed of the checking element.

It is especially very advantageous if the control device defines the pivotal position and the pivotal speed of the checking element. In an alternative embodiment, the control device defines the acceleration of the checking element. To this end, the speed and the position of the checking element must then be determined by means of an integration process. By virtue of the provision of the pivotal position and the corresponding time intervals, the speed is then defined, being determined, in particular, by a calculation involving the formation of quotients. The acceleration can be determined in like manner by the formation of quotients.

It is especially very advantageous if the control device is able to undergo a learning (teach in) cycle for determining the monitoring region. By virtue of such a learning cycle, it can be determined where the transition region, through which the checking element should pivot quickly, ends, and where the monitoring region, in which the torque limit is reduced, should begin. In particular, the corresponding angular values, which separate the two regions from each other, do not have to be entered directly, but the monitoring device in accordance with the invention will itself determine where the boundaries lie.

It is expedient if the monitoring region is set by the control device such that it begins at a certain angular amount prior to a body detected in the learning cycle. This angular amount may be 5° or 10° for example. Optimal subdivision of the whole pivotal range of the checking element can thereby be obtained, in that, it is ensured on the one hand, that the checking element will pass quickly through the transition region, and on the other hand, that accurate monitoring will be ensured in the monitoring region in which the predetermined position of the body lies or in which it should be monitored as to whether a "foreign body" is located therein.

It is expedient for stop means to be provided for limiting the pivotal movement of the checking element. An internal reference position for the monitoring device in accordance with the invention can thereby be made available and it cannot be displaced.

Expediently, for the purposes of setting a reference position of the checking element, this is moved at a predefined speed into a stop position in which corresponding stop means touch. An unaltered reference position is thereby made available.

Expediently, for the purposes of defining the reference position of the checking element in the stop position, corresponding stop means are rotated against one another at low torque. It is thereby possible, for this touching of the stops, which is necessary for defining the reference position, to be effected in a defined manner and thus allow the reference position to be precisely defined.

The monitoring device in accordance with the invention, can be employed in "difficult" working conditions if a seal is arranged between the checking element and a shaft by means of which the checking element is driven.

Such an inventive seal prevents working fluids or swarf or other impurities from penetrating into the region between the shaft and the checking element and/or between the shaft and the housing. Metal swarf may, for example, become trapped between the housing and the checking element in such a manner as to hinder the rotation of the shaft. Such processes will interfere with the operation of the monitoring device i.e. it will not be able to perform its real task, checking for a predefined position of a body or checking for the presence of a body. The seal arranged in accordance with the invention will prevent metal swarf, in particular, from reaching the shaft. In addition, since an additional seal is provided, the sealing of the housing relative to the exterior space will be improved. The monitoring device in accordance with the invention will thereby be less susceptible to disturbances and the downtime, in which the operation of the monitoring device is interrupted and hence it can no longer perform its real task, will be much reduced. Moreover, metal swarf can perforate the shaft passage seal in the housing so that fluids may enter into the interior of the housing. The additional seal provided in accordance with the invention completely prevents metal swarf from reaching the shaft seal.

It is particularly very advantageous if the seal abuts the checking element and abuts the housing. The intrusion of swarf and/or fluids into the region between the checking element and the shaft and/or between the housing and the shaft is thereby prevented.

It is advantageous for the seal to be formed symmetrically about an axis and especially about a rotational axis of the shaft. A substantially angle-independent frictional moment can thereby be obtained, especially during the rotational movement of the checking element, thereby achieving simpler control of the pivotal movement of the checking element.

It is particularly very expedient if the seal is seated between the checking element and the housing co-axially relative to the shaft.

It is expedient for an intermediate space to be formed between the shaft and the seal. Consequently, the seal itself does not abut on the shaft and will not hinder its rotational movement.

In an advantageous variant of an embodiment, provision is made for the seal to be rotationally fixed relative to the checking element. The seal is thus carried along by the checking element during the pivotal movement of the checking element whilst it will rotate relative to the housing. Basically, it is also conceivable for the seal to be rotationally fixed relative to the housing and then to rotate the checking element relative to the seal. However, the proposed variant is more expedient from a constructional point of view since a seal must be provided around the shaft in the housing in order to seal the passage for the shaft through the housing. The corresponding annular space is not available for the arrangement of a mounting element for the seal between the checking element and the housing. By contrast, a further seal for the checking element itself does not need to be provided apart from the seal between the checking element and the housing.

Expediently, the checking element comprises a mounting element for the seal onto which the latter is adapted to be put in order to fix it non-rotationally relative to the checking element. An easily manufacturable, easily releasable but nevertheless sealed connection between the seal and the checking element in accordance with the invention can thereby be achieved in a simple manner.

From a manufacturing point of view it is particularly expedient if the mounting element is formed by a mounting ring through which the shaft is guided and onto which the seal is adapted to be put. The seal can thereby be arranged completely around the shaft in a simple manner.

Furthermore, it is expedient to provide an annular recess for accommodating the seal between the mounting element and the checking element. An abutment face for an end-face of the seal is made available by such an annular recess, and in addition, the seal can rest in full area contact on an outer surface of the mounting ring. The seal is thus connected to a large surface area of the checking element so that a good sealing effect is thereby achieved.

Expediently, an outer diameter of the seal substantially corresponds to the diameter of the checking element so that, firstly, a large abutment face for the seal is available on the checking element and secondly, material will not be wasted unnecessarily.

It is particularly very expedient if the seal comprises a packing ring for the purposes of putting it onto the checking element. Good sealing properties between the seal and the checking element are achieved by virtue of such a packing ring.

Furthermore, it is particularly very advantageous if the seal comprises a collar having a V-shaped sealing lip which abuts the housing. Good sealing properties are achieved between the seal and the housing by virtue of such a sealing lip, and the spacing between the checking element and the housing can be varied by means of the sealing lip without the need to provide a plurality of seals for this purpose, since, to a certain extent, the V-shaped sealing lip allows the axial extent with reference to the direction of the rotational axis to be set.

It is expedient if the collar is rotatable with the checking element relative to the housing.

In order to obtain good sealing properties between the seal and the housing on the one hand, and in order to be able to vary the spacing between the checking element and the housing on the other, it is advantageous if the outer surface of the collar is substantially in the form of a truncated cone at least when force is not being applied thereto in the axial direction. An imaginary cone peak of the V-shaped collar then points towards the checking element. Thus, when the axial spacing between the checking element and the housing becomes smaller, the collar can spread in a radial direction so that the effectiveness of the seal will not worsen despite the change in this spacing.

It is expedient if the inner surface of the collar is in the form of a truncated cone at least when force is not being applied thereto in the axial direction. This ensures that the sealing lip will be in full area contact with the housing even when the spacing between the checking element and the housing becomes smaller thereby achieving good sealing properties.

It is expedient if an axial extent of the seal can be varied by the collar so that the monitoring device in accordance with the invention can be employed in variable manners and is particularly economical.

Further features and advantages of the invention form the subject matter of the following description taken in conjunction with the sketched illustration of the embodiment.

Figures 1, 2, 3:
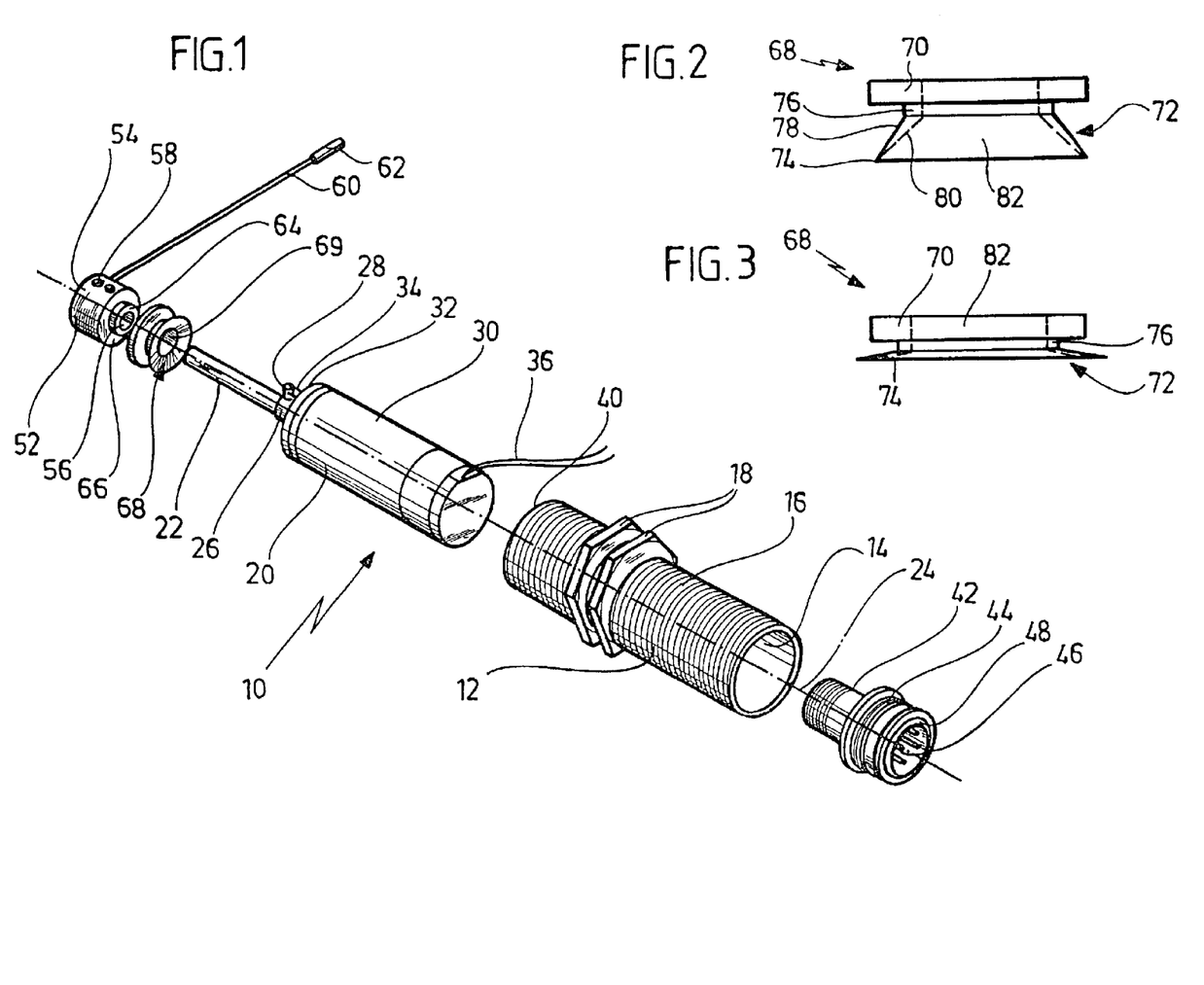
FIG. 1 shows a perspective view of a sensing head for the monitoring device in accordance with the invention.
FIG. 2 a side view of a seal between a checking element and a housing for the sensing head, wherein no axial pressure is being exerted on this seal.
FIG. 3 the seal of FIG. 2, wherein an axial pressure is being exerted on the seal.

An embodiment of a monitoring device in accordance with the invention comprises a sensing head bearing the general reference 10 which is shown in perspective in FIG. 1. This has a cylindrical housing 12 having a reception space 14 formed in its interior. The housing 12 is provided with an outer thread 16 on its outer surface, nuts 18 being screwable onto said thread. The monitoring device can be positioned, for example, in a machine tool using these nuts 18.

The reception space 14 serves for accommodating an electric motor 20, this being, in particular, a dc motor. This electric motor 20 comprises a shaft 22 which is arranged co-axially with respect to the axis 24 of the housing 12 which is thus the rotational axis of the shaft 22.

Stop means are provided for limiting the rotational movement of the shaft 22. In the embodiment illustrated in FIG. 1, a ring 26 is situated on the shaft 22, said ring being provided with a radially outwardly pointing pin 28. The electric motor 20 itself comprises a housing 30 and a further pin 34 is arranged on an end-face 32 of this housing 30 through which the shaft 22 enters, said pin being fixed to the housing in non-rotational manner whence it is also non-rotational relative to the housing 12 of the monitoring device 10 and is parallel to but spaced from the axis 24. When the pin 28 abuts the pin 34, then the rotational movement of the shaft 22 in the direction of the pin 34 is limited thereby.

The electric motor 20 is provided with terminal leads 36 which are connected to a digital angle transmitter 38 (see FIG. 4) and from there, they extend to a plug. In this variant of an embodiment, the digital angle transmitter 38 is disposed in the reception space 14.

The housing 12 of the sensing head 10 comprises an end-face 40 which is provided with a passage opening for the shaft 22 of the electric motor 20. A seal, which prevents penetration of foreign bodies or working fluids into the housing 12, is seated in the passage opening (not shown in the Figure).

The reception space 14 is closed at its end remote from the end-face 40 by a closure element 42 which is preferably in the form of a closure stopper. The closure element 42 has an internal thread 44 into which a plug 46 provided with electrical terminals 48 can be screwed. The terminal leads 36 are connected to the electrical terminals 48. A connecting cable 84 (FIG. 4) leads from the plug 46 to a control apparatus bearing the general reference 49 in FIG. 4. This control apparatus incorporates, at least in part, a control device 50 for controlling and regulating the monitoring device.

A checking element 52, which is pivotal by the shaft 22, is seated on the shaft 22. This checking element 52 comprises a cylinder element 54, which is provided with a central recess 56 through which this cylinder element 54 can be seated on the shaft 22. The cylinder element can be fixed to the shaft 22 by clamping screws 58. A sensing needle 60 having a stop body 62 at its front end is arranged on the cylinder element 54 transversely to the rotational axis 24 and, in particular, perpendicularly thereto (i.e. in a radial direction). This sensing needle 60 is limited by said stop body 62 when the shaft 22 rotates.

The cylinder element 54 comprises an annular mounting element 64 facing the shaft 22 around the recess 56, the internal diameter of said mounting element corresponding substantially to the diameter of the recess 56 but the outer diameter thereof being reduced relative to that of the cylinder element 54. An annular recess 66 is thereby formed between the mounting ring 64 and the cylinder element 54 of the checking element 52.

A seal 68 is adapted to be put onto the mounting ring 64, said seal being arranged around the shaft 22 between the housing 12, in particular, its end-face 40, and the checking element 52 in order to prevent penetration of fluids and impurities, such as saw or drilling swarf for example, into the region between the checking element and the housing 12. For this purpose, the seal 68 abuts on both the cylinder element 54 and the end-face 40 of the housing 12. An intermediate space 69 is formed between the seal 68 and the shaft 22 so that the shaft 22 does not directly abut the seal 68.

As is shown in FIGS. 2 and 3, the seal 68 comprises a packing ring 70 which is adapted to be put onto the mounting ring 64. The outer diameter of this packing ring 70 substantially corresponds to the outer diameter of the cylinder element 54 and the inner diameter thereof substantially corresponds to the outer diameter of the mounting ring 64, and it is preferably selected to be somewhat smaller so that the seal 68 forms a non-rotational friction-fit on the mounting ring 64 when it has been put into place.

A collar 72 having a sealing lip 74 of V-shaped cross-section is connected to the packing ring in one piece manner. Provision may be made for an intermediate ring 76 to be arranged between the collar 72 and the packing ring 70.

When the seal is not subjected to an axial force, the sealing lip 74 has a substantially truncated-cone-shaped outer surface 78 as shown in FIG. 2, and the imaginary cone peak points towards the checking element 52. The inner surface 80 of the collar 72 is likewise substantially in the form of a truncated cone, and the angle of the cone for the inner surface 80 is smaller than that for the outer surface 78.

By virtue of such a construction, it is ensured that the sealing effect between the checking element 52 and the housing 12 can be achieved even in the case of differing spacings between this checking element 52 and the end-face 40 of the housing 12. As is shown in FIG. 3, the collar 72 can be compressed and hence the sealing lip 74 will spread outwardly when it is subjected to an axial force (i.e. when the checking element 52 is displaced towards the end-face 40 of the housing 12). Since said sealing lip continues to rest on the end-face 40, the sealing effect is maintained even when the spacing between the checking element 52 and the housing 12 is varied. The seal 68 remains on the end-face 40 over an end region comprised by the inner surface 80 due to the truncated-cone-shaped construction of the inner surface 80.

During a pivotal movement of the checking element relative to the housing 12, the seal 68, which is held by the mounting ring 64 so as to rotate with the checking element 52, rotates relative to the housing 12. The shaft 22 is located completely within an inner space 82 of the seal 68 comprised by the packing ring 70 and the collar 72. This means that the shaft 22 is sealed relative to the exterior by the seal 68.

Figure 4:
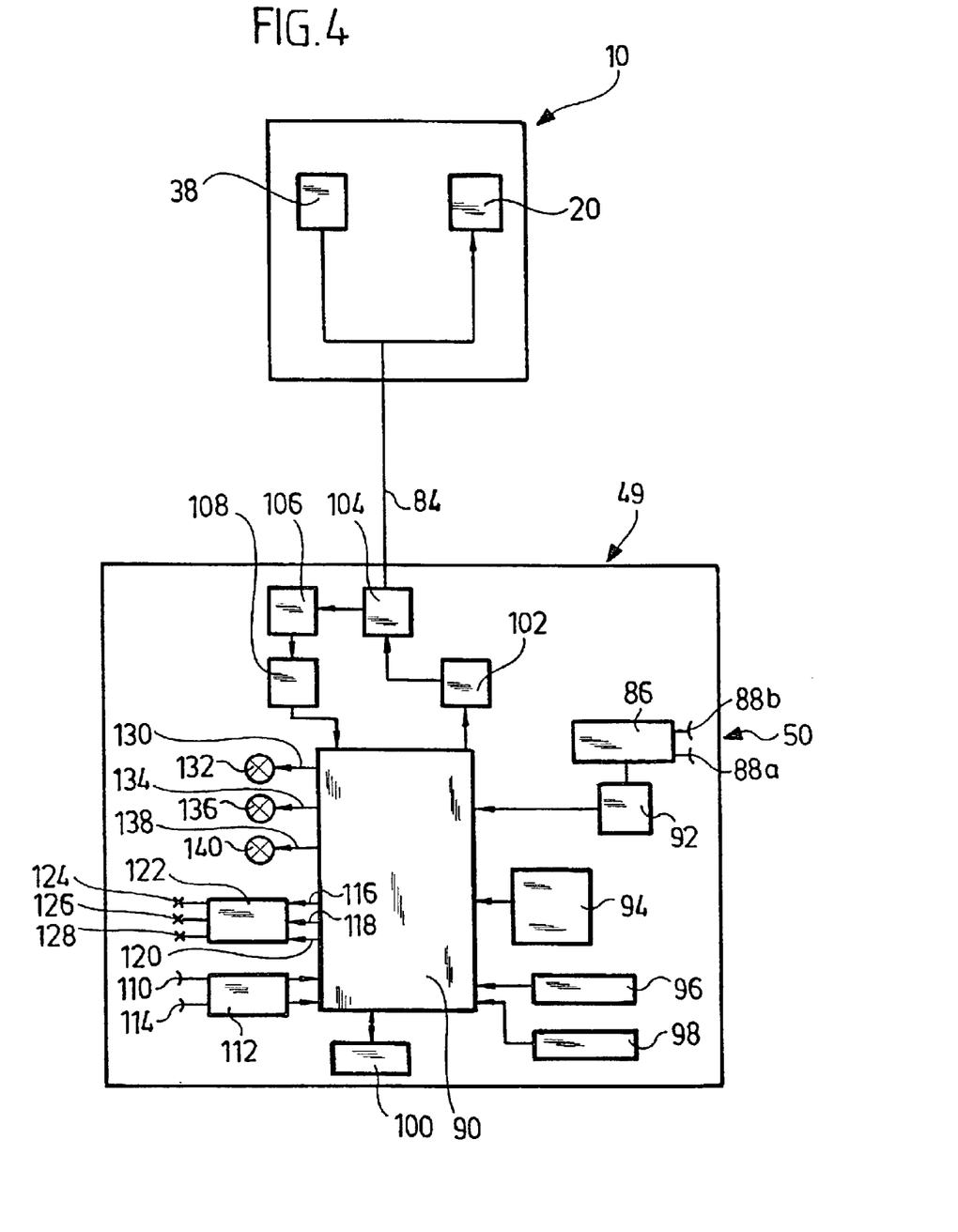
FIG. 4 a block circuit diagram of a control device for the monitoring device in accordance with the invention.

As is shown in FIG. 4, the control device 49 is connected via the connecting cable 84 to the sensing head 10. The electric motor 20 is supplied with electrical energy via this connecting cable 84. Furthermore, the control unit 50 supplies control signals to the digital angle transmitter 38 which, in turn, controls the electric motor 20.

The control device 50 incorporates a current supply means 86 which comprises terminals 88a, 88b for an energy source. Provision is made, for example, for a voltage of 24 volts to be applied between the terminals 88a and 88b. An EMC filter 92 is arranged between the current supply means and a microcontroller 90 so as to absorb or compensate for electromagnetic disturbances.

Furthermore, there is provided a switch, especially a rotary switch 94 for a pivotal angle of the checking element 52 which is connected to one input of the microcontroller 90. (In FIG. 4, the inputs of the microcontroller 90 are indicated by arrows pointing towards it and the outputs are indicated by arrows pointing away therefrom.) A pivotal angle for the checking element 52 is defined by means of this rotary switch.

A further input of the microcontroller 90 is provided with a changeover switch 96, which is used for switching between a tool monitoring operation for checking for a predetermined position of a body, or a free space monitoring operation for checking for the presence of a body.

Switching between a clockwise or an anticlockwise pivotal movement can be effected by a further changeover switch 98.

Furthermore the microcontroller 90 is connected to a nonvolatile store 100, for example, an EEPROM, in which certain pivotal positions of the checking element 52 can be stored so that the microcontroller can resort to them during the operation of the monitoring device in accordance with the invention.

An output of the microcontroller 90 is connected to a motor driver 102 for the electric motor 20. An EMC filter 104 for absorbing or compensating for electromagnetic interference is located between the motor driver 102 and the electric motor 20. The electric motor 20 is connected to the EMC filter 104 via the connecting cable 84.

The digital angle transmitter 38 is connected via this EMC filter 104 to an intelligent transducer 106, which, in turn, is connected via a filter 108 to the microcontroller 90. The microcontroller 90 can thus evaluate the signals from the digital angle transmitter 38, which are conveyed to the electric motor 20, and hence determine, in particular, the instantaneous position, speed and acceleration of the checking element 52.

The microcontroller 90 has a "Start" input 110, which causes the monitoring operation to begin when a signal is applied thereto. An input protection means 112 is arranged between this input 110 and the microcontroller so as to absorb input signals which could lead to destruction of the microcontroller.

A "learning" input 114 is also provided which is likewise connected via the input protection means 112 to the microcontroller 90. When this input 114 has a signal applied thereto, a learning cycle is started in which the checking element 52 learns the predefined position of a body (tool monitoring process).

Furthermore, the microcontroller 90 comprises three outputs 116, 118, 120 which are connected to an output driver 122 from which the output signals of the monitoring device are derivable. A signal is thereby derivable from a first output 124 "OK" of this output driver 122 which indicates that the monitoring process has been correctly carried out and that no disturbances have been found (i.e. that during the tool monitoring process, the body was detected at its predefined position, or that during the free space monitoring process, no body was detected in the monitoring region).

A signal is derivable from a second output 126 "nOK" indicating that the monitoring process has run successfully but that a disturbance was detected, i.e. either the body was not at its predefined position (tool monitoring process) or the presence of a body was detected in the monitoring region (free space monitoring process).

The output driver 152 has a third output 128 "FAULT" which indicates that the monitoring process has not been successful. The reason for this may, for example, be that impurities such as swarf have interfered with the rotational movement of the shaft 22. However, there are a variety of other reasons that could have led to a disturbance in the monitoring operation.

In order to indicate the result of the monitoring process in an optical manner, the microcontroller 90 also has an output 130 which is connected to an LED 132 which turns green if the monitoring process has run successfully and no disturbances were detected. Another terminal 134 is provided which is connected to an LED 136 which gives out a red light if the monitoring process has run successfully but a disturbance was detected in the sense that the body was not at its predefined position (tool monitoring process), or that a body is present in the monitoring region (free space monitoring process). A terminal 138 is connected to an LED 140 which emits an optical signal (for example a yellow light) if the control device 50 has established that an error occurred during the monitoring process.

The operation of the monitoring device in accordance with the invention proceeds as follows:

After the control device 50 has been switched on, the shaft is slowly rotated until the stop means 28 and 34 abut one another, i.e. the pins 28 and 34 strike one another. A reference position is thereby set. The pin 28 is then pressed against the pin 34 by a small amount of torque so as to reset the zero position again. The microcontroller 90 then reads the position of the switches 94, 96 and 98. If the rotary switch 94 occupies a wrong or unsuitable switching position (for example the pivotal angle 0°), then the step of pressing the pin 28 against the pin 34 with a low level of torque and the reading of the switch positions is repeated. If the rotary switch 94 is in a suitable position, it is checked as to whether the switch 96 is set for the tool monitoring mode (detection of a body at a predefined position) or whether the free space monitoring mode (detection of a body in a monitoring region) is set via the switch 96. In the event that the "free space monitoring" mode is set, then the corresponding start input is interrogated. In the event that the "tool monitoring" mode is set, then the "learning" input 114 will be interrogated and a learning process may then be initiated. Following a successful learning process, the "Start" input 110 for the tool monitoring process is interrogated and a tool monitoring operation is carried out in correspondence therewith. If the interrogation indicates that the learning process was not successful, then the step, in which the pins 28 and 34 are pressed together at a low torque level for setting the reference position, is passed over and the corresponding successive steps mentioned above are executed.

A learning (teach in) cycle proceeds as follows:

The microcontroller 90 first checks as to whether the "learning" input 114 is active. If the check is positive, then the pivotal angle set via the rotary switch 94 is checked once again. If the pivotal angle 0° is set then it is not possible to learn anything. The blocking position 0° is stored in the store 100 and the checking element is slowly pivoted back into its starting position (reference position).

In the event of a pivotal angle setting not equal to 0°, then the checking element is pivoted at a slow speed to the angle set via the rotary switch 94 and it is checked, with the intervention of a time delay step, as to whether the checking element and the sensing needle 60 have reached a position switch which indicates the end of a monitoring region. Should the arrival at this position switch be detected, then this means that there was no obstacle in the set range and hence that a blocking position could not be learnt. The blocking position zero is then stored in the store 100 and the checking element is slowly pivoted back into the reference position.

If, during the check as to whether the checking element 52 has reached the position switch, it is determined that the checking element was pivoted beyond a permissible range (it is for this reason that the time delay step is utilised), then this means that the obstacle lies outside the permissible range. The blocking position zero is then stored in the store 100 and the checking element 52 is slowly pivoted back into the reference position.

In the positive event that the checking element 52 lies in the permissible range, then the learning process was successful and the instantaneous position of the checking element 52 represents the position of the obstacle, i.e. the predefined position of the body. Thereafter, the checking element 52 is likewise slowly pivoted back into the reference position.

The tool monitoring process then proceeds as follows:

Firstly, it is checked as to whether the "Start" input 110 is active. Each of the LEDs 132, 136 and 140, and the outputs 124, 126 and 128 are then switched off. Thereafter, it is checked as to whether 0° is stored as a learned position in the store 100. If this is the case, then this means that it is not possible to effect the sensing operation as the position has not been learnt successfully and consequently no sensing is carried out. Signals are applied to the outputs 126 "nOK" and 128 "Fault".

In the event that a learned position not equal to 0° has been determined, the checking element 52 is pivoted through a transition region 142 (FIGS. 5 and 6) and it is checked as to whether a specific maximum time has expired. In the event that this maximum time has expired, the LEDs 136 and 140 are switched on, the checking element 52 is returned at high speed to its reference position, and signals are applied to the outputs 126 and 128. The expiry of the time limit can be caused, in particular, by the fact that curls of swarf are hindering or blocking the movement of the sensing needle 60.

Figure 5:
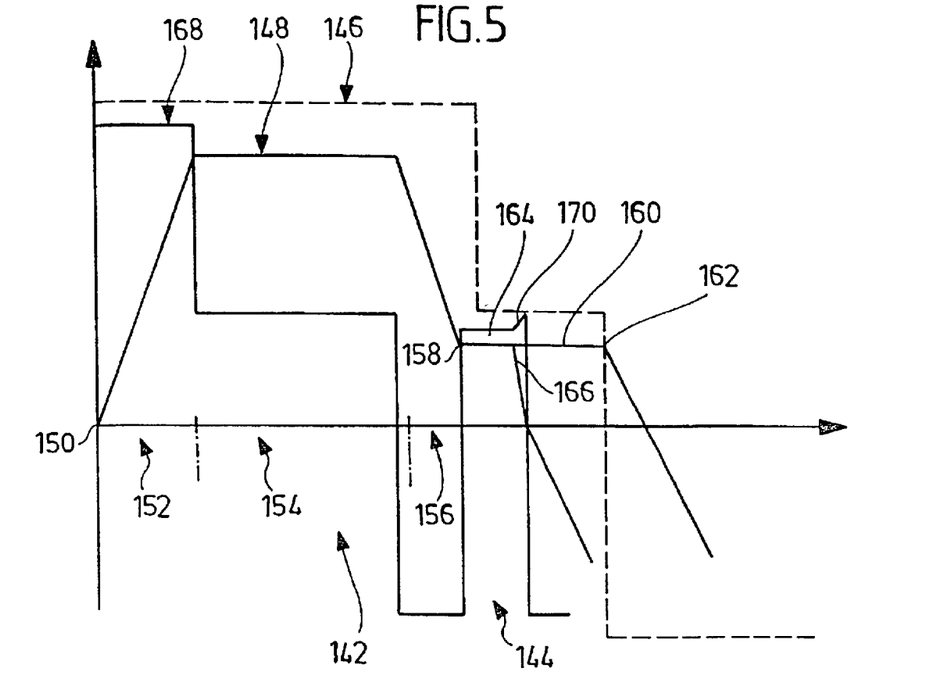
FIG. 5 a schematic illustration of the timing course for the speed and the torque of the checking element in a transition region and a monitoring region and FIG. 6 a schematic illustration of the pivotal position of the checking element in the transition region and the monitoring region.
Figure 6:
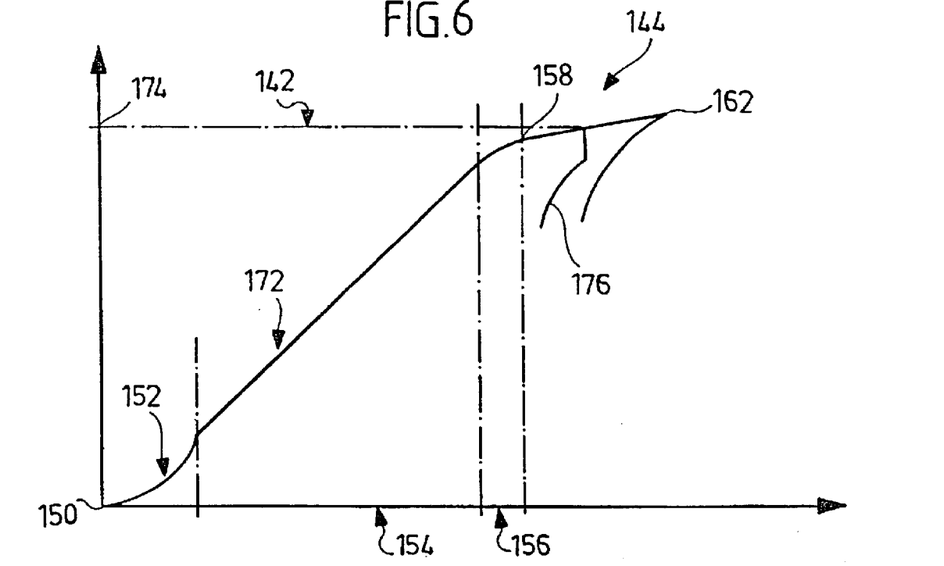

In the event that it is registered that the time limit has still not expired, the checking element is pivoted into a monitoring region 144. It is then checked once more, as to whether a time limit has expired. If this is the case, then a disturbance has occurred in the monitoring device and the LEDs 136 and 140 are switched on again in an appropriate manner, and signals are applied to the outputs 126 and 128. If this time limit has not expired, then the whole of the monitoring region will be traversed, whereafter, at the end of the monitoring region, it is checked as to whether the checking element is still within the permissible pivotal angle range. If this is not the case, then this will be due to the fact that a body is not located in the monitoring region. The LED 136 "NOK" is then switched on, the checking element 52 is pivoted back at high speed into its reference position and signals are applied to the "nOK" output 126. Signals are not applied to the "FAULT" output 128 since the monitoring process has been properly effected, but no body has been detected in the monitoring region 144.

In the event that the checking element 52 is located in a permissible pivotal angle range, the LED 132 is switched on and signals are applied to the "OK" output 124, although signals are not applied to the outputs 126 and 128.

The traversal of the transition region 142 and the monitoring region 144 will be described in more detail hereinbelow.

If the free space monitoring process has been set via the changeover switch 96, i.e. the check as to whether a body is present in the monitoring region, then it is firstly rechecked as to whether the "START" input 110 is active. If this check proves positive, then the LEDs 132, 136 and 140 and the outputs 124, 126 and 128 are switched off. If the pivotal angle position set via the rotary switch is 0°, then monitoring is not possible and the LEDs 132, 136 and 140 remain switched off. The checking element 52 is then pivoted back to its reference position, insofar as it is not already there, and signals are applied to the "FAULT" output 128.

If the set position differs from 0°, then the checking element 52 passes through the transition region 142 and the monitoring region 144, as will be explained in more detail hereinbelow, and it is checked as to whether the checking element 52 is still within the permissible range. If this is not the case, then this means that a body is present in the monitoring region 144 whereby the "OK" LED 132 remains switched off whereas the "nOK" LED 136 is switched on. The checking element is then pivoted back into its reference position and signals are applied to the "nOK" output 126, whereas the other two outputs 124 and 128 do not receive signals.

By contrast however, if the checking element 52 is in the permissible range, then this means that no body was present in the monitoring region 144. Consequently, the LED 132 is switched on, the checking element is pivoted back into its reference position and signals are applied to the "OK" output 124, whilst signals are not applied to the outputs 126 and 128.

The control device 50 controls and regulates the position, the pivotal speed and the torque of the checking element 52 and its sensing needle 60 via the microcontroller 90 and the digital angle transmitter 38. To this end, the motor current through the electric motor 20 is controlled and regulated in order to control and regulate the torque thereof, and the voltage applied to the electric motor 20 is controlled and regulated in order to control and regulate the rotation of the shaft 22 by means of the digital angle transmitter 38. In particular, provision may be made for the microcontroller 90 to produce a pulse width modulated signal, which contains information regarding the position control/regulating process as well as the moment control/regulating process.

Basically, the transition region 142 serves for the purpose of allowing the checking element 52 to be rapidly moved into the monitoring region 144 commencing from a starting position (reference position). The actual detection process for checking for the predefined position of a body or for checking for the presence of a body takes place in the monitoring region 144.

The torque of the electric motor 20, with which the latter is effective via the shaft 22 on the checking element 52, is determined by the amount of current applied to this dc motor. The microcontroller 90 sets this current to be such that the maximum possible torque 146, which limits the torque of the checking element 52 and which is sketched by means of the dashed lines in FIG. 5, is reduced in the monitoring region 144 relative to the transition region 142. This thereby prevents the sensing needle 60 of the checking element 52 from striking a body which it is trying to detect with a high level of torque or from exerting a correspondingly high force on the body should this be present in the pivotal path of the sensing needle 60.

A speed curve 148 representing the pivotal speed of the checking element 52 is shown in FIG. 5 in a schematic manner. Commencing from the reference position 150, the transition region 142 comprises an acceleration region 152 in which the checking element is accelerated, i.e. its speed is increased from zero up to an essentially constant value. The speed is kept substantially constant in a region 154 following this acceleration region, whereafter the speed is reduced to a lower value than that in the region 154 in a braking region 156 i.e. the checking element 52 is braked. The monitoring region 144 adjoins the braking region 156. The transition point 158 between the braking region 156 and the monitoring region 144 lies at a predetermined angular position prior to the predefined position of the body (in the case of the tool monitoring process), for example, in an angular range of 10° prior to this predefined position.

The torque limit is reduced during the transition from the braking region 156 into the monitoring region 144, preferably within a short time interval after the transition point 158. It is thereby ensured that there is a sufficiently large torque for pivoting the checking element 52 in the monitoring region 144 at a substantially constant lower speed; on the other hand, it is also ensured thereby that, over the greater part of the monitoring region 144, the maximum possible torque 146 is reduced relative to that in the transition region 142.

If there is no body in the monitoring region 144, the checking element 52 will be pivoted through the whole of the monitoring region 144 at a substantially constant speed, as is indicated by the section 160 of the curve in FIG. 5. Should the end 162 of the monitoring region 144 be reached, then the checking element 52 is pivoted rapidly back into the reference position 150, and the checking element is braked for the purposes of reversing the direction of rotation and is then accelerated in the counter direction.

If there is a body in the monitoring region 144, then the checking element 52 will be braked within a very short period of time from its substantially constant speed 164 down to zero, as is indicated by the section of the curve 166. Thereafter, the checking element 52 can be quickly pivoted back into the reference position 150.

The variation in torque is illustrated by the curve 168 in FIG. 5. A high level of torque, which lies below the maximum torque level 146, is exerted in the acceleration region 152 so as to accelerate the checking element up to a constant speed from the reference position 150. This torque is higher than the frictional moment exerted via the seal 68 so as to produce a net acceleration.

In the course of the transition into the region 154, the motor torque is reduced by appropriately reducing the motor current so as to obtain a constant speed for the checking element 52. The torque then corresponds substantially to the frictional moment. The torque is reversed in the braking region 156 in order to thereby brake the checking element 52. In essence, such reversal only occurs in the braking region 156. During the transition 148, the torque is increased again and held at a value which is somewhat lower than that in the range 154.

Should the checking element 52 reach the body, then the torque will rise since the microcontroller 90 registers the slowing down of the checking element and tries to compensate for it. This rise, which is indicated by 170 in FIG. 5, can be attributed, inter alia, to the fact that the control processes cannot occur instantaneously, but rather, need a certain transient time. However, due to the provision of the torque limiting arrangement in accordance with the invention, via which the torque is reduced in the monitoring region 144, the torque of the checking element 52 will be prevented from exceeding its maximum permissible value despite the rise 170.

In conjunction with the drop in speed 166 to zero and/or the rise in the torque level, a control signal will then be produced by the microcontroller 90 thereby causing the direction of the torque to be reversed so as to quickly pivot the checking element 52 back into the reference position 150.

In the event that there is no body in the monitoring region 144 against which the sensing needle 60 can strike, the constant torque is maintained up to the end 162 of the monitoring region so as to obtain a substantially constant speed for the checking element 52, and, at the end 162 of the monitoring region, the torque is reversed so as to rapidly conduct the checking element 52 back again into the reference position 150 (this is not shown in FIG. 5).

Commencing from the reference position 152, the pivotal path 172 of the checking element 52 is shown plotted against time in the schematic illustration in FIG. 6. Commencing from its reference position (the zero position), the pivotal angle increases non-linearly in the acceleration region 152 whereas, in the region 154, the pivotal angle rises substantially linearly due to the constant speed. Then, due to the braking action, the rise becomes more gradual than linear in the braking region 156 and then reverts to rising linearly in the monitoring region, although this rise is more gradual than that in the region 154. If the body is reached at the pivotal angle 174, then this pivotal angle does not alter in time for as long as the pivotal direction is not reversed. This reversal is indicated by the section 176 of the curve.

In the event that the sensing needle 60 does not meet a body, the checking element 52 will pass through the whole of the monitoring region 144, the pivotal movement then being reversed at the end 162 thereof whereby the pivotal angle will become smaller again. The path-time curve for the reverse pivoting process when returning to the reference position 150 extends in a corresponding manner.

The angle of rotation within a specified time interval (a time increment) can be defined with the aid of the digital angle transmitter 38 which is an increment transmitter. The pivotal position of the checking element 52 is known to the microcontroller at every moment in time, as is also, at least to a first approximation, the instantaneous speed thereof in the form of a differential quotient between corresponding path intervals and time intervals. The torque can be determined by the motor current.

Predetermined control and regulating curves for the position, the speed and the torque can be stored, for example, in a discrete form in tables in the store 100. The microcontroller 90 compares the actual values with the stored values. In the event of deviations therefrom, the motor driver 102 is controlled accordingly so as to ensure that the pivotal movement of the checking element 52 will closely follow the predefined curves. The curves shown in FIGS. 5 and 6 correspond to those curves predefined in tabular form, i.e. they represent the controlled values.

What is claimed is:

1. A monitoring device for checking for a predefined position of a body or for checking for the presence of a body, comprising a pivotal checking element (52), a motor (20) for driving the checking element (52) and a control device (50) for controlling the pivotal movement of the checking element (52), characterised in that the checking element is pivotable commencing from a starting position (150) through a transition region (142) into a monitoring region (144) in which the predefined position of the body lies or in which the presence of a body should be monitored, and in that the control device (50) limits the torque of the checking element (52) in such a manner that the maximum possible torque in the monitoring region (144) is reduced relative to that in the transition region (142).

2. A monitoring device in accordance with claim 1, characterised in that the motor (20) is a dc motor and the supply of current to the motor (20) is limitable by the control device (50).

3. A monitoring device in accordance with claim 1, characterised in that the control device (50) controls the pivotal movement of the checking element (52) via combined position, speed and torque controlling.

4. A monitoring device in accordance with claim 1, characterised in that the speed of the checking element (52) is reducible during its transfer from the transition region (142) into the monitoring region (144).

5. A monitoring device in accordance with claim 4, characterised in that the reduction of the torque limit is effected after the reduction in the speed of the checking element (52).

6. A monitoring device in accordance with claim 1, characterised in that the control device (50) comprises a digital angle transmitter (38).

7. A monitoring device in accordance with claim 1, characterised in that the transition region (142) comprises an acceleration region (152) in which the speed of the checking element (52) is increased commencing from the starting position (150).

8. A monitoring device in accordance with claim 1, characterised in that the transition region (142) comprises a braking region (156) in which the speed of the checking element (52) is reduced.

9. A monitoring device in accordance with claim 1, characterised in that the speed of the checking element (52) is maintained substantially constant between an acceleration region (152) and a braking region (156) of the transition region (142).

10. A monitoring device in accordance with claim 1, characterised in that the speed of the checking element (52) is maintained substantially constant in the monitoring region (144).

11. A monitoring device in accordance with claim 1, characterised in that the control device (50) controls the speed and torque by means of the time-dependent control of the position of the checking element (52).

12. A monitoring device in accordance with claim 11, characterised in that the control device (50) sets the pivotal position of the checking element (52).

13. A monitoring device in accordance with claim 11, characterised in that the control device (50) sets the pivotal speed of the checking element (52).

14. A monitoring device in accordance with claim 11, characterised in that the control device (50) sets the pivotal position and the pivotal speed of the checking element (52).

15. A monitoring device in accordance with claim 1, characterised in that via the control device (50) a learning cycle is performable for determining the monitoring region (144).

16. A monitoring device in accordance with claim 15, characterised in that the monitoring region (144) is set by the control device (50) such that it begins at a certain angular amount prior to a position of the body detected in the learning cycle.

17. A monitoring device in accordance with claim 1, characterised in that stop means (28, 34) are provided for limiting the pivotal movement of the checking element (52).

18. A monitoring device in accordance with claim 17, characterised in that, for the purposes of setting a reference position (150) of the checking element (52), this is moved at a predefined speed into a stop position in which corresponding stop means (28, 34) touch.

19. A monitoring device in accordance with claim 18, characterised in that, for the purposes of defining the reference position (150) of the checking element (52) in the stop position, corresponding stop means (28, 34) are rotated against each other at low torque.

20. A monitoring device in accordance with claim 1, characterised in that a seal (68) is arranged between the checking element (52) and a housing (12) for accommodating the motor (20) around a shaft (22) by means of which the checking element (52) is driven.

21. A monitoring device in accordance with claim 20, characterised in that the seal (68) abuts the checking element (52) and abuts the housing (12).

22. A monitoring device in accordance with claim 20, characterised in that the seal (68) is formed symmetrically about an axis (24).

23. A monitoring device in accordance with claim 20, characterised in that the seal (68) is seated between the checking element (52) and the housing (12) co-axially relative to the shaft (22).

24. A monitoring device in accordance with claim 20, characterised in that an intermediate space (69) is formed between the shaft (22) and the seal (68).

25. A monitoring device in accordance with claim 20, characterised in that the seal (68) is rotationally fixed relative to the checking element (52).

26. A monitoring device in accordance with claim 25, characterised in that the checking element (52) comprises a mounting element (64) for the seal (68) onto which the latter is adapted to be put in order to fix it non-rotationally to the checking element (52).

27. A monitoring device in accordance with claim 26, characterised in that the mounting element (64) is formed by a mounting ring through which the shaft (22) is guided and onto which the seal (68) is adapted to be put.

28. A monitoring device in accordance with claim 26, characterised in that an annular recess (66) for accommodating the seal (68) is formed between the mounting element (64) and the checking element (52).

29. A monitoring device in accordance with claim 20, characterised in that an outer diameter of the seal (68) substantially corresponds to the diameter of the checking element (52).

30. A monitoring device in accordance with claim 20, characterised in that the seal (68) comprises a packing ring (70) for the purposes of putting it onto the checking element (52).

31. A monitoring device in accordance with claim 20, characterised in that the seal (68) comprises a collar (72) having a V-shaped sealing lip (74) which abuts the housing (12).

32. A monitoring device in accordance with claim 31, characterised in that the collar (72) is rotatable with the checking element (52) relative to the housing (12).

33. A monitoring device in accordance with claim 31, characterised in that the outer surface (78) of the collar (72) is substantially in the form of a truncated cone at least when force is not being applied thereto in the axial direction.

34. A monitoring device in accordance with claim 33, characterised in that an imaginary cone peak of the collar (72) points towards the checking element (52).

35. A monitoring device in accordance with claim 33, characterised in that the inner surface (80) of the collar (72) is substantially in the form of a truncated cone at least when force is not being applied thereto in the axial direction.

36. A monitoring device in accordance with claim 31, characterised in that an axial extent of the seal (68) can be varied via the collar (70).

* * * * *